US008522607B2

(12) United States Patent
Grossmann et al.

(10) Patent No.: US 8,522,607 B2
(45) Date of Patent: Sep. 3, 2013

(54) METHOD AND DEVICE FOR CHECKING THE ADJUSTMENT OF A PLURALITY OF ACTUATORS DRIVEN BY A COMMON DRIVE IN DIFFERENT MASS FLOW CHANNELS

(75) Inventors: Alex Grossmann, Leonberg (DE); Soenke Mannal, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 13/121,624

(22) PCT Filed: Aug. 12, 2009

(86) PCT No.: PCT/EP2009/060433
§ 371 (c)(1),
(2), (4) Date: Jun. 27, 2011

(87) PCT Pub. No.: WO2010/037587
PCT Pub. Date: Apr. 8, 2010

(65) Prior Publication Data

US 2011/0252875 A1 Oct. 20, 2011

(30) Foreign Application Priority Data

Sep. 30, 2008 (DE) ........................ 10 2008 042 513

(51) Int. Cl.
*G01M 15/05* (2006.01)

(52) U.S. Cl.
USPC ....................................................... 73/114.36

(58) Field of Classification Search
USPC ............................ 73/114.31, 114.32, 114.36
See application file for complete search history.

(56) References Cited

U.S. PATENT DOCUMENTS

| | | | | |
|---|---|---|---|---|
| 5,157,956 | A * | 10/1992 | Isaji et al. | 73/1.75 |
| 5,220,828 | A * | 6/1993 | Sodeno et al. | 73/114.36 |
| 7,043,351 | B2 * | 5/2006 | Grossmann et al. | 701/103 |
| 2005/0155574 | A1 | 7/2005 | Hedrick | |
| 2007/0221167 | A1 | 9/2007 | Costin et al. | |
| 2011/0133106 | A1 * | 6/2011 | Grossmann et al. | 251/129.12 |

FOREIGN PATENT DOCUMENTS

| | | |
|---|---|---|
| DE | 102 36 078 | 2/2004 |
| EP | 0 641 924 | 3/1995 |
| FR | 2 860 267 | 4/2005 |

OTHER PUBLICATIONS

International Search Report for PCT/EP2009/060433, dated Nov. 3, 2009.

* cited by examiner

*Primary Examiner* — Eric S McCall
(74) *Attorney, Agent, or Firm* — Kenyon & Kenyon LLP

(57) ABSTRACT

In a method and a device for checking the adjustment of a plurality of actuators driven by a common drive in different mass flow channels of an internal combustion engine, the actuators are adjusted between a first limit stop and a second limit stop in the particular mass flow channel. The actuators are brought by their common drive to the first limit stop. A first value of a variable that is characteristic of a position of the common drive of the actuators is determined when the first limit stop is reached. The actuators are brought by their common drive to the second limit stop. A second value of the variable that is characteristic of the position of the common drive of the actuators is ascertained upon reaching the second limit stop. A difference is determined between the first value and the second value. The difference is compared in terms of absolute value to at least one predefined threshold value. An error in the adjustment of the actuators in the various mass flow channels is recognized when the absolute value of the difference deviates unacceptably from at least one predefined threshold value.

10 Claims, 3 Drawing Sheets

METHOD AND DEVICE FOR CHECKING THE ADJUSTMENT OF A PLURALITY OF ACTUATORS DRIVEN BY A COMMON DRIVE IN DIFFERENT MASS FLOW CHANNELS

FIELD OF THE INVENTION

The present invention relates to a method and a device for checking the adjustment of a plurality of actuators driven by a common drive in different mass flow channels.

BACKGROUND INFORMATION

Actuators, for example in the form of throttle valves, are used in internal combustion engines for controlling and/or regulating the rate of the air flow supplied to the internal combustion engine. Standard throttle valves are typically used for this purpose; i.e., a throttle valve controls the rate of the air flow in a mass flow channel that is supplied, for example in the form of a cylindrical inflow, to the internal combustion engine. To be able to maintain the requisite accuracy in the air flow control, the opening angle of the throttle valve must be ascertained as precisely as possible. Angular-position sensors are used for this purpose, for example. However, these sensors must be calibrated to the mechanical limit stops of the throttle valve, to compensate, inter alia, for assembly tolerances. This is accomplished by what is generally referred to as "learning" the limit stops. The throttle valve is adjustable in the position, respectively opening angle thereof, between two mechanical limit stops in the mass flow channel. The throttle valve is fully closed at one of the two limit stops and fully open at the other one of the two limit stops. The process of learning the limit stops entails the throttle valve approaching the limit stops and, depending on the particular limit stop, the throttle valve angles measured upon reaching the limit stops are defined as throttle valve angles for a fully open throttle valve, respectively as throttle valve angles for a fully closed throttle valve.

However, for relatively large internal combustion engines, dual- or multi-flow systems are also used, where a plurality of cylinder banks are provided, each having its own air supply and separate throttle valve. Normally, a plurality of standard throttle valves are used in such systems, namely one per inflow path. In the meantime, however, due, inter alia, to discussions that are increasingly focused on installation space, throttle valves are also being used that are connected by a common shaft (in each case, one per inflow path). Throttle valves connected in this manner then have only one common drive, thereby eliminating the need for further drives for the throttle valves. The throttle valves driven via the common drive in the various mass flow channels may then be adjusted between a first mechanical limit stop and a second mechanical limit stop in the particular mass flow channel.

SUMMARY

In contrast, the method according to example embodiments of the present invention and the device according to example embodiments of the present invention having the features the features described herein have the advantage that the actuators are brought by their common drive to the first limit stop; that a first value of a variable that is characteristic of a position of the common drive of the actuators is ascertained when the first limit stop is reached; that the actuators are brought by their common drive to the second limit stop; that a second value of the variable that is characteristic of the position of the common drive of the actuators is ascertained when the second limit stop is reached; that a difference is determined between the first value and the second value; that the difference is compared in terms of absolute value to at least one predefined threshold value; and that an error in the adjustment of the actuators is recognized in the various mass flow channels when the absolute value of the difference deviates unacceptably from at least one predefined threshold value. In this manner, it is possible to recognize a faulty adjustment of the actuators in the different mass flow channels simply, reliably and with little complexity. In addition, the mentioned difference is a measure of the synchronism of the actuators.

It is particularly advantageous that, for the case when the first limit stop is contacted by one of the actuators when the actuators are brought to the first limit stop, and the second limit stop is contacted by the common drive when the actuators are brought to the second limit stop, a faulty adjustment is recognized between the actuators configured, in particular, on a common drive shaft, or a faulty adjustment of the second limit stop is recognized when, in terms of absolute value, the difference is less than a first predefined threshold value. The type of faulty adjustment may be readily inferred in this manner.

When a faulty adjustment of the second limit stop is able to be ruled out, it is then possible to uniquely infer a faulty adjustment between the actuators and ascertain a lack of synchronism of the actuators. When the actuators are configured on a common drive shaft, it is then possible in this case to ascertain an unwanted mutual offset of the actuators on the common drive shaft.

This is also true for the case when the first limit stop is contacted by one of the actuators when the actuators are brought to the first limit stop, and when the second limit stop is contacted by the common drive when the actuators are brought to the second limit stop; a faulty adjustment of the second limit stop then being recognized when, in terms of absolute value, the difference exceeds a second predefined threshold value. In this case, a faulty adjustment of the second limit stop may then be assumed with certainty.

It is also advantageous when the second predefined threshold value is selected to be greater than the first predefined threshold value. In this manner, a tolerance range for the absolute value of the difference is created between the first predefined threshold value and the second predefined threshold value, within which assembly tolerances of the actuators and of the second limit stop are acceptable.

It is also advantageous when the first limit stop is configured at a wall of the particular mass flow channel or is formed by the wall of the particular mass flow channel, and when the actuators are in their fully closed position upon reaching the first limit stop. In this manner, the configuration or design of the first limit stop makes it possible to reliably recognize a faulty adjustment of the actuators in the mass flow channels.

It is also advantageous when the second limit stop is configured as a limit stop for the common drive, and when the actuators are in their fully open position upon reaching the second limit stop. In this manner, the design of the second limit stop makes it possible to reliably recognize a faulty adjustment of the actuators in the mass flow channels, respectively a faulty adjustment of the second limit stop.

It is also advantageous when the actuators reaching one of the limit stops is recognized on the basis of the exceedance in terms of absolute value of a predefined threshold value by a drive current of the actuators. In this manner, a recognition of the actuators reaching one of the limit stops is made possible in a simple, reliable and not very complex process, thereby enhancing the reliability of the checking the adjustment of the actuators in the different mass flow channels is enhanced.

Example embodiments of the present invention are represented in the drawing and explained in more detail in the following description.

DETAILED DESCRIPTION

Figure 1:
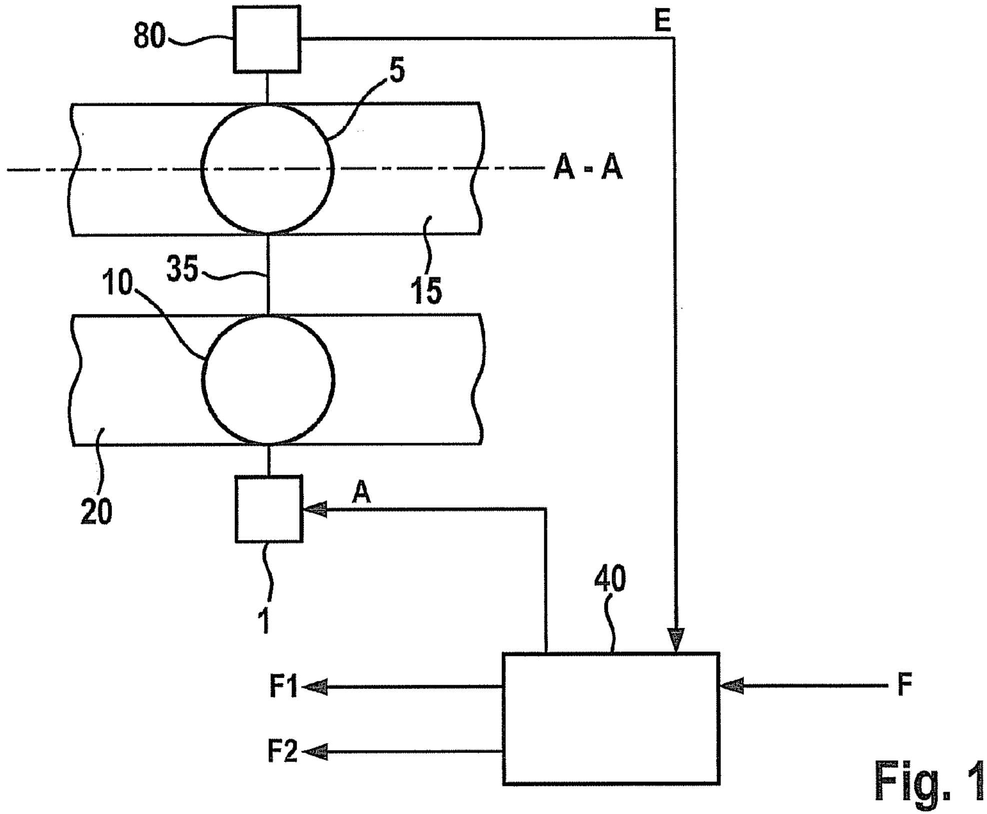
FIG. 1 shows a schematic configuration for controlling and sensing the position of two jointly driven throttle valves in different mass flow channels.

In FIG. 1, 15 denotes a first mass flow channel and 20 a second mass flow channel, as may be provided, for example, for supplying fresh air to a cylinder bank of an internal combustion engine in each case. A first actuator 5, for example in the form of a throttle valve, is configured in first mass flow channel 15. A second actuator 10, likewise in the form of a throttle valve, for example, is configured in second mass flow channel 20. The two throttle valves 5, 10 are driven by a common drive 1 and, in accordance with the example of FIG. 1, are configured on a common drive shaft 35. Common drive 1 is driven by a control device 40 in response to a control signal A. Control signal A is a drive current, for example. A sensor system 80 records the position of throttle valves 5, 10, respectively of common drive shaft 35, and transmits a measurement signal E to this effect back to control device 40. Sensor system 80 may be designed in a conventional manner, for example, in the form of a throttle valve potentiometer or also as a contactless system, for example, as an optical, magnetic or inductive system. The position of throttle valves 5, 10, respectively of common drive shaft 35 may be recorded by sensor system 80 in the form of opening angle of throttle valves 5, 10. Since the two throttle valves 5, 10 are mounted on common drive shaft 35, the position of throttle valves 5, 10, respectively of the opening angle of throttle valves 5, 10 at the mechanical limit stops may only be learned when the two throttle valves 5, 10 have the exact same adjustment on common drive shaft 35. If the two throttle valves 5, 10 have a mutual angular difference, then the opening angle, respectively the position of throttle valves 5, 10, is able to be suitably calibrated by the process of learning the mechanical limit stops of throttle valves 5, 10, as described. The rate of air flow supplied via throttle valves 5, 10 through mass flow channels 15, 20 of the internal combustion engine is consequently not able to be adjusted accurately enough.

Example embodiments of the present invention, therefore, provide for a faulty adjustment of throttle valves 5, 10 to be detected in mass flow channels 15, 20. A diagnosis to this effect is performed by control device 40. For this purpose, control device 40 receives an enable signal F which activates the diagnosis of the adjustment of throttle valves 5, 10 in mass flow channels 15, 20. This enable signal F is generated in operating states of the internal combustion engine that do not require a precise adjustment of the air supply to the internal combustion engine. This is the case, for example, in the deceleration fuel-cutoff operating state or also in what is generally referred to as the control unit lag following the switching off of the internal combustion engine. The diagnosis may also be performed after the internal combustion engine is switched off, as long as no load has yet been impressed thereon, for example, by actuation of an accelerator pedal or auxiliary systems, such as air-conditioning systems, a car radio, etc. in the case of a vehicle driven by an internal combustion engine.

As a function of the detected faulty adjustment, the control device generates a first error signal F1 or a second error signal F2. Error signals F1, F2 may, for example, be optically and/or acoustically reproduced on a reproduction unit. They may also be entered into a fault memory that may be read out during a workshop visit. Due to error signals F1, F2, it may also be provided to reduce the power output of the internal combustion engine in the event of a recognized fault or, ultimately, even to completely switch off the same.

Figure 2:
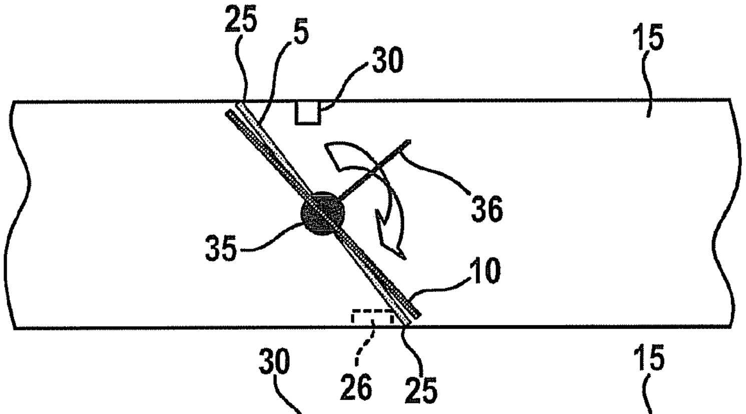
FIG. 2 shows a first longitudinal section through a first mass flow channel in accordance with a sectional plane A-A in FIG. 1 for a fully closed position of the throttle valves.

A longitudinal section through first mass flow channel 15 in accordance with sectional plane A-A marked in FIG. 1 is sketched in FIG. 2. The same reference numerals denote the same elements as in FIG. 1. In accordance with the longitudinal section of FIG. 2, first throttle valve 5 is in its fully closed position or, in other words, in its fully closed position. In this position, first throttle valve 5 is situated at a first mechanical limit stop 25 that is formed by the wall of first mass flow channel 15. Alternatively, and as shown by dashed lines in FIG. 2, first mechanical limit stop may also be in the form of a projection 26 from the wall of first mass flow channel 15. In its fully closed position, first throttle valve 5 abuts on first mechanical limit stop 25 or 26. To bring first throttle valve 5 from any given position to first mechanical limit stop 25, respectively 26, first throttle valve 5 is moved by common drive shaft 35 in accordance with the arrow direction marked in FIG. 2. To clarify the difficulty of the faulty adjustment of the two throttle valves 5, 10, the position of second throttle valve 10 that is located in second mass flow channel 20, is additionally sketched in FIG. 2. As is apparent in FIG. 2, there is an angular offset between first throttle valve 5 and second throttle valve 10. Thus, located in the fully closed position of first throttle valve 5 is second throttle valve 10, which is likewise driven by common drive shaft 35, is not yet in its fully closed position and may not be brought to its fully closed position because common drive shaft 35 is not able to be moved further in the closing direction due to first throttle valve 5 reaching first mechanical limit stop 25, 26. In this context, second mass flow channel 20 also has a corresponding first mechanical limit stop that is ideally configured at the same location and with the same geometry as in first mass flow channel 15.

Figure 3:
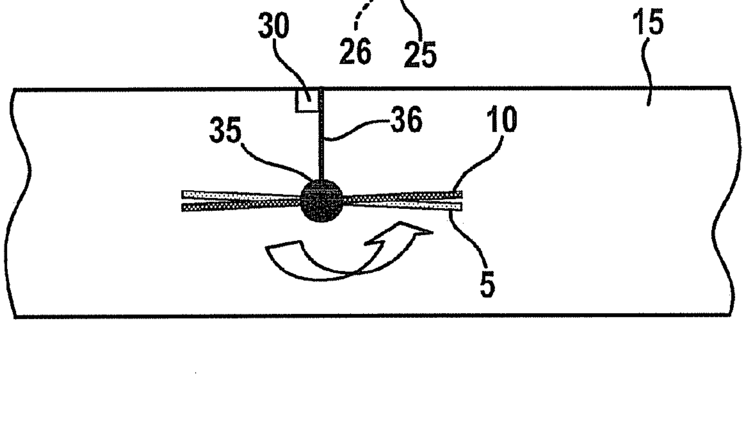
FIG. 3 shows a longitudinal section in accordance with sectional plane A-A in FIG. 1 through one of the mass flow channels for the case that the throttle valves are in their fully open position.

Also shown in FIG. 2 is a second mechanical limit stop 30 that is contacted by common drive 1, respectively common drive shaft 35, when throttle valves 5, 10 are fully open, as is shown in FIG. 3. FIG. 3 shows the longitudinal section along sectional plane A-A of FIG. 1 in the case of fully open throttle valves 5, 10. Second mechanical limit stop 30 is symbolically illustrated in FIG. 2 and FIG. 3 and is normally configured outside of mass flow channels 15, 20, for example, in the gearing of common drive 1. Thus, drive shaft 35 is directly blocked by second mechanical limit stop 30, as is illustrated in FIG. 3 by crosspiece 36 that is connected to the shared drive shaft 35. Thus, second mechanical limit stop 30 is normally configured in the gearing of common drive 1. Thus, it is intended that the representation in FIGS. 2 and 3 only illustrate the action of second mechanical limit stop 30. Therefore, when second mechanical limit stop 30 is configured in the gearing of shared drive 1, there is naturally also no need for crosspiece 36, respectively, it would be configured within the gearing of common drive 1. In this context, this type of second mechanical limit stop 30 is reasonably well known to one skilled in the art and is, therefore, not clarified in greater detail here. As mentioned, only the description of the functional principle is relevant here. To bring throttle valves 5, 10 to their fully open position, they may be brought from any given position by movement in the arrow direction according to FIG. 3, the fully open position being reached by the striking of crosspiece 36 on second mechanical limit stop 30.

The angular offset of the two throttle valves 5, 10 reduces the angular range that is available for the motion of common drive shaft 35 between first mechanical limit stop 25, 26 and second mechanical limit stop 30. The method according to example embodiments of the present invention and the device according to example embodiments of the present invention make use of this fact for checking the adjustment of throttle valves 5, 10 in mass flow channels 15, 20. It is namely provided in accordance with example embodiments of the present invention to determine the angular range that is available for common drive shaft 35 and to ascertain by threshold value comparison whether the available angular range is smaller than a value that is expected for a correct adjustment of throttle valves 5, 10. If this is the case, then a faulty adjustment between the two throttle valves 5, 10 is assumed. However, a faulty adjustment of the two throttle valves 5, 10 in mass flow channels 15, 20 may also be derived from the position of second mechanical limit stop 30 relative to common drive shaft 35. If second mechanical limit stop 30 is displaced to the right in the representation according to FIGS. 2 and 3, the adjustable angular range of shared drive shaft 35 is then likewise reduced. If, on the other hand, second mechanical limit stop 30 is displaced to the left in the representation according to FIGS. 2 and 3, the adjustable angular range for common drive shaft 35 is possibly increased beyond a maximum allowable second threshold value. In both cases, the fully open position of throttle valves 5, 10 is not adjustable, even when the two throttle valves 5, 10 do not have a mutual angular offset. A faulty adjustment of throttle valves 5, 10 in mass flow channels 15, 20 may also be due to the mutual deviation of the diameters of the normally cylindrical mass flow channels 15, 20, that is inherent to the manufacturing, and/or to the two mass flow channels 15, 20 being mutually offset due to the assembly, and or throttle valves 5, 10 not being present axisymmetrically to common drive shaft 35. In all of these cases, the adjustable angular range of common drive shaft 35 may be limited to an undesirable extent.

In accordance with example embodiments of the present invention, by evaluating the available angular range of common drive shaft 35, a faulty adjustment of the two throttle valves 5, 10 is recognized in the two mass flow channels 15, 20, whether it be due to a faulty adjustment between the two throttle valves 5, 10, i.e., due to an angular offset between the two throttle valves 5, 10, an asymmetrical configuration of throttle valves 5, 10 on the common drive shaft 35, a mutual offset of mass flow channels 15, 20, a different diameter of mass flow channels 15, 20 or a faulty adjustment of second mechanical limit stop 30 relative to throttle valves 5, 10. Moreover, in accordance with example embodiments of the present invention, the latter case of the faulty adjustment of second mechanical limit stop 30 relative to throttle valves 5, 10 may be differentiated from the first mentioned cases of the faulty adjustment of throttle valves 5, 10.

Figure 4:
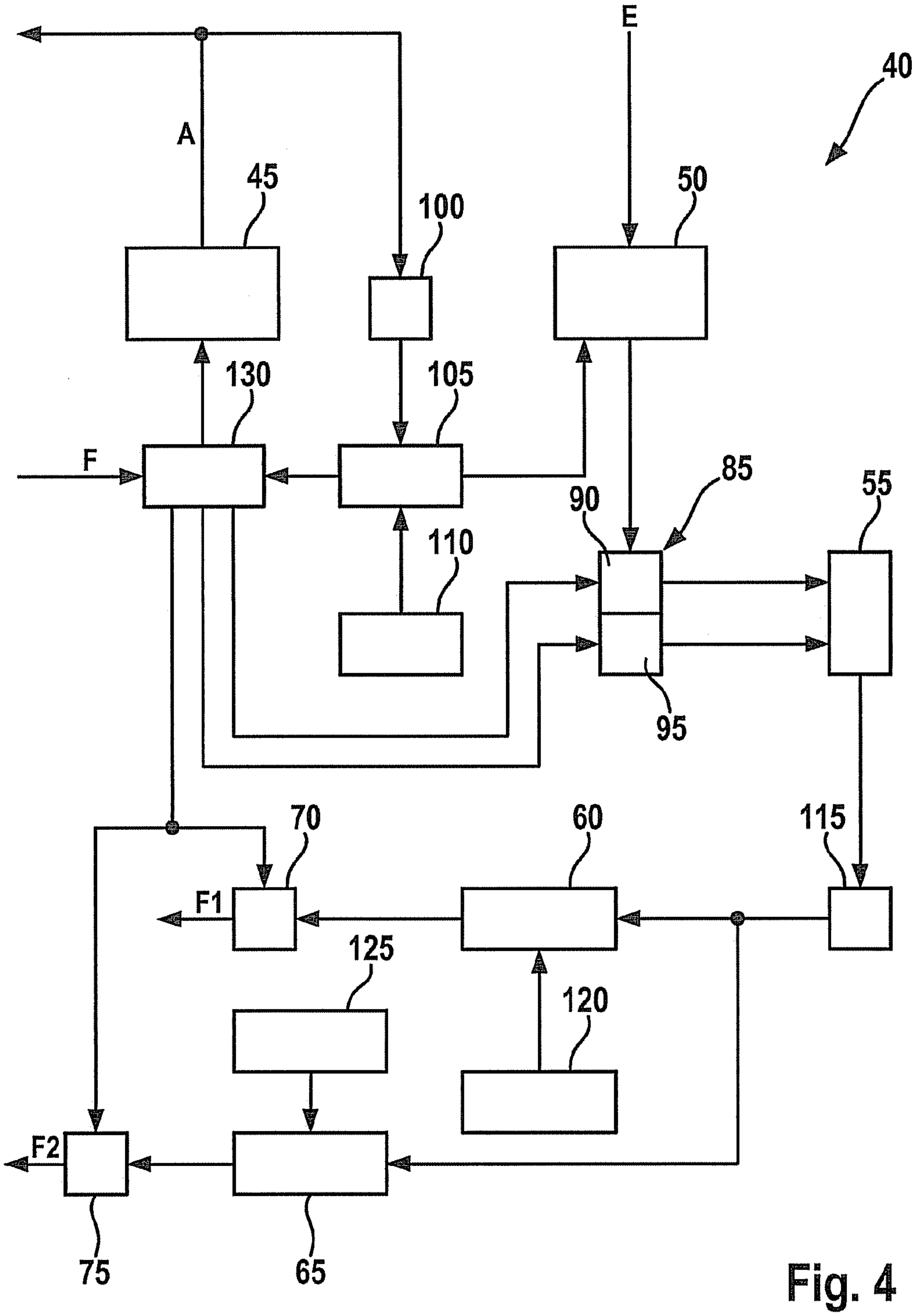
FIG. 4 shows a flow chart for illustrating the design of the device according to an example embodiment of the present invention and the functional sequence of the method according to an example embodiment of the present invention.

FIG. 4 shows a functional circuit diagram of control device 40 according to an example embodiment of the present invention. Control device 40 includes a diagnostic unit 130 that controls and coordinates the diagnostic sequence thereof. In terms of software and/or hardware, control device 40 may be implemented in an engine control of the internal combustion engine, for example, or it may be configured as a separate control unit. An enable signal F is fed to diagnostic unit 130. If this is set during an overrun condition or during a control unit lag, for example, then the diagnostic unit initiates the diagnosis according to the present invention. On the other hand, if enable signal F is reset, for example, in a full-throttle operating state of the internal combustion engine, then no diagnosis is performed by diagnostic unit 130. The case of set enable signal F is considered in the following. As soon as diagnostic unit 130 receives a positive edge of enable signal F that is used to set enable signal F, it prompts an adjusting unit 45 to generate a control signal A in the form of a drive current, in response to which common drive 1, in the form of a drive motor, is prompted to bring the two throttle valves 5, 10 to the fully closed position. As soon as one of the two throttle valves 5, 10 reaches its first mechanical limit stop 25, 26, drive current A begins to increase in order to overcome the obstacle. Drive current A is also fed to a first absolute-value generator 100 which generates the absolute value of drive current A. The generated absolute value of drive current A is fed to a first comparison unit 105 and is compared there to a predefined threshold value for drive current A from a first threshold value memory 110. If the absolute value of the drive current exceeds the predefined threshold value for the drive current, then first comparison unit 105 transmits a setting signal both to a determination unit 50, as well as to diagnostic unit 130. Predefined threshold value for drive current A is applied on a test stand in a way that makes it possible to reliably recognize, for example, at least one of the two throttle valves 5, 10 reaching first mechanical limit stop 25, 30. To this end, the predefined threshold value must be selected to be high enough. However, in the sense of a most rapid possible recognition of at least one of the two throttle valves 5, 10 reaching first mechanical limit stop 25, 30, and to avoid too high of a drive current A, the predefined threshold value in threshold value memory 110 should not be selected to be too high. Thus, the predefined threshold value for drive current A in first threshold value memory 110 may be selected on the test stand, on the one hand, for example, as a compromise between a greatest possible value for reliably recognizing at least one of the two throttle valves 5, 10 reaching first mechanical limit stop 25, 30, and, on the other hand, a smallest possible value for a most rapid possible recognition of at least one of the two throttle valves 5, 10 reaching first mechanical limit stop 25, 26, and to avoid too high of a drive current A. The measurement signal of sensor system 80 is fed to determination unit 50. In this manner, on the basis of measurement signal E supplied thereto, determination unit 50 ascertains the current position of common drive shaft 35 in each instance. As soon as determination unit 50 receives a setting signal from first comparison unit 105, it retransmits the currently determined position of common drive shaft 35 to a memory unit 85. In the case that a reset signal is received from first comparison unit 105, determination unit 50 does not retransmit the currently determined position of common drive shaft 35 to memory unit 85. The ascertained position of common drive shaft 35 is the angular position thereof, for example. Upon receipt of the first setting signal from first comparison unit 105, from the time of enabling of the diagnosis, diagnostic unit 130 controls a first memory location 90 of memory unit 85 to receive the current value supplied by determination unit 50, for the position of common drive shaft 35. Under the condition that enable signal F continues to be set, diagnostic unit 130 subsequently prompts adjusting unit 45 to bring the two throttle valves 5, 10 to their fully open position. To this end, adjusting unit 45 generates a corresponding drive current A, whose sign, in comparison, is inverted in order to bring throttle valves 5, 10 to such a fully closed position. As long as second mechanical limit stop 30 is not reached, in terms of absolute value, drive current A falls below the predefined threshold value for drive current A, so that first comparison unit 105 transmits a reset signal both to determination unit 50, as well as to diagnostic unit 130. Upon the reaching of second mechanical limit stop 30 by common drive shaft 35, respectively, as shown in FIGS. 2 and 3, by crosspiece 36, drive current A increases again in terms of absolute value beyond the predetermined threshold value for drive current A, so that first comparison unit 105, in turn, transmits a setting signal to determination unit 50, as well as to diagnostic unit 130. Since, in terms of absolute value, upon the reaching of second mechanical limit stop 30, drive current A increases similarly to the reaching of first mechanical limit stop 25, 26, the predefined threshold value for drive current A may also be used for detecting the reaching of second mechanical limit stop 30. Upon receipt of the setting signal from first comparison unit 105, diagnostic unit 130 controls memory unit 85 such that a second memory location 95 of memory unit 85 is enabled for an overwrite operation. Upon receipt of the setting signal from first comparison unit 105, determination unit 50 transmits the currently determined position of common drive shaft 35 to memory unit 85, where it is stored in enabled second memory location 95. Thus, in the case of a fully closed position of throttle valves 5, 10, the current position of common drive shaft 35 resides in first memory location 90. In the case of fully open throttle valves 5, 10, the position of common drive shaft 35 resides in second memory location 95. In the following, the position stored in first memory location 90 is referred to as first position, and the position stored in second memory location 95, as second position. The first position and the second position are fed to a subtraction unit 55. Subtraction unit 55 computes the difference between the first position and the second position and transmits the computed difference to a second absolute-value generator 115. Second absolute-value generator 115 generates the absolute value of the computed difference and transmits it to a second comparison unit 60 and to a third comparison unit 65. The absolute value of the difference is compared in first comparison unit 60 to a first predefined threshold value from a second threshold value memory 120. If the absolute value of the difference is less than the first predefined threshold value of second threshold value memory 120, then first comparison unit 60 transmits a setting signal to a first error detection unit 70; otherwise, a reset signal. First predefined threshold value is selected to correspond to the angular difference of common drive shaft 35 between the fully open position and the fully closed position of throttle valves 5, 10 for the case of throttle valves 5, 10 that have been adjusted without error in mass flow channels 15, 20, minus a permissible tolerance value. If the absolute value of the difference is less than the first predefined threshold value of second threshold value memory 120, then the angular range of common drive shaft 35 is unacceptably limited, whether it be due to a faulty adjustment, respectively an angular offset between the two throttle valves 5, 10, due to different geometries of the two mass flow channels 15, 20, a different position of common drive shaft 35 in both mass flow channels 15, 20, a lack of symmetry of at least one of throttle valves 5, 10 relative to common drive shaft 35, or due to a faulty adjustment of second mechanical limit stop 30 relative to the position of throttle valves 5, 10, respectively to common drive shaft 35.

In third comparison unit 65, the absolute value of the difference is compared to a second predefined threshold value of a third threshold value memory 125. If the absolute value of the difference exceeds the second predefined threshold value of third threshold value memory 125, third comparison unit 65, at the output thereof, then transmits a setting signal to a second error detection unit 75; otherwise, a reset signal is transmitted. In this context, the second predefined threshold value of third threshold value memory 125 is selected to be greater than the first predefined threshold value of second threshold value memory 120. It corresponds to the angular range that is covered by common drive shaft 35 between the fully closed and fully open position of throttle valves 5, 10 in the case that no faulty adjustment of the two throttle valves 5, 10 is present in mass flow channels 15, 20, with the addition of a tolerance value. This tolerance value allows for the tolerances of an assembly-induced offset of second mechanical limit stop 30 relative to the two throttle valves 5, 10, respectively common drive shaft 35. Therefore, if the absolute value of the difference exceeds the second predefined threshold value of third threshold value memory 125, then this indicates that, in any case, there must be a faulty adjustment of second mechanical limit stop 30 relative to common drive shaft 35.

Upon receipt of the second setting signal from first comparison unit 105 since receipt of set enable signal F, diagnostic unit 130 also transmits a setting signal to first error detection unit 70 and second error detection unit 75. Error detection units 70, 75 are activated in this manner. In the activated state, in the case of a receipt of a set signal from second comparison unit 60, first error detection unit 70, at the output thereof, transmits a set first error signal F1. This shows, as described, a faulty adjustment of throttle valves 5, 10 in mass flow channels 15, 20, in the case of which the angular range of shared drive shaft 35 was unacceptably limited, in particular, by an angular offset between the two throttle valves 5, 10 or a displacement to the right of the top mechanical limit stop 30 relative to common drive shaft 35 in the example according to FIG. 3 to the right, or due to differences in geometry between first mass flow channel 15 and second mass flow channel 20, due to a lack of symmetry of at least one of throttle valves 5, 10 relative to common drive shaft 35, due to a different positioning of common drive shaft 35 in first mass flow channel 15 and in second mass flow channel 20, or due to different geometries of the two throttle valves 5, 10, in particular, different diameters of throttle valves 5, 10. The angular range of common drive shaft 35 may also be reduced by wear to the gearing of common drive 1. Set first error signal F1 may, for example, be entered into a fault memory (not shown in FIG. 4) and be read out from there, for example, during a workshop visit.

Upon receipt of the set signal from diagnostic unit 130, second error detection unit 75 is also activated, which, in response to receipt of a set signal from third comparison unit 65 at the output thereof, transmits a set second error signal F2; otherwise, a reset second error signal F2. From set second error signal F2, it is inferable that there is an unacceptable increase in the angular range that is adjustable from common drive shaft 35, due to a faulty adjustment of second mechanical limit stop 30 relative to throttle valves 5, 10, respectively relative to common drive shaft 35 in mass flow channels 15, 20.

First error signal F1 is reset when first error detection unit 70 receives a reset signal from first comparison unit 60 or a reset signal from diagnostic unit 130. Second error signal F2 of second error detection unit 75 is reset when second error detection unit 75 receives a reset signal from third comparison unit 65 or a reset signal from diagnostic unit 130. Second error signal F2 may also be stored in a fault memory (not shown in FIG. 4) and be read out during a workshop visit. Different fault memories may advantageously be used for both error signals F1, F2, making it possible to differentiate between the two error signals F1, F2.

As a consequence of a set first error signal F1 and/or of a set second error signal F2, a power output of the internal combustion engine may also be reduced, or the internal combustion engine may also be ultimately switched off.

Once the described diagnosis is complete, it may be performed repeatedly in the described manner for as long as enable signal F is set. As soon as the diagnosis is started once again, thus, as soon as diagnostic unit 130 prompts adjusting unit 45 to bring throttle valves 5, 10 again to the fully closed position, diagnostic unit 130 transmits a reset signal to first error detection unit 70 and to second error detection unit 75. Error detection units 70, 75 are then only enabled again by a corresponding setting signal from diagnostic unit 130 when throttle valves 5, 10 have again reached second mechanical limit stop 30. This ensures that the process of overwriting memory locations 90, 95 of memory unit 85 once more until the fully open position of throttle valves 5, 10 is reached the next time does not lead to an incorrect diagnosis.

With regard to the diagnosis according to example embodiments of the present invention, it was previously described that throttle valves 5, 10 are brought to their fully closed position and subsequently to their fully open position. However, the diagnosis may also be carried out in exactly the inverse manner, throttle valves 5, 10 being initially brought to their fully open position and subsequently to their fully closed position. Since the absolute value of the difference is generated in second absolute-value generator 115, it is irrelevant whether throttle valves 5, 10 are first brought to their fully closed position for the diagnosis and then to their fully open position or first to their fully open position and then to their fully closed position.

Figure 5:
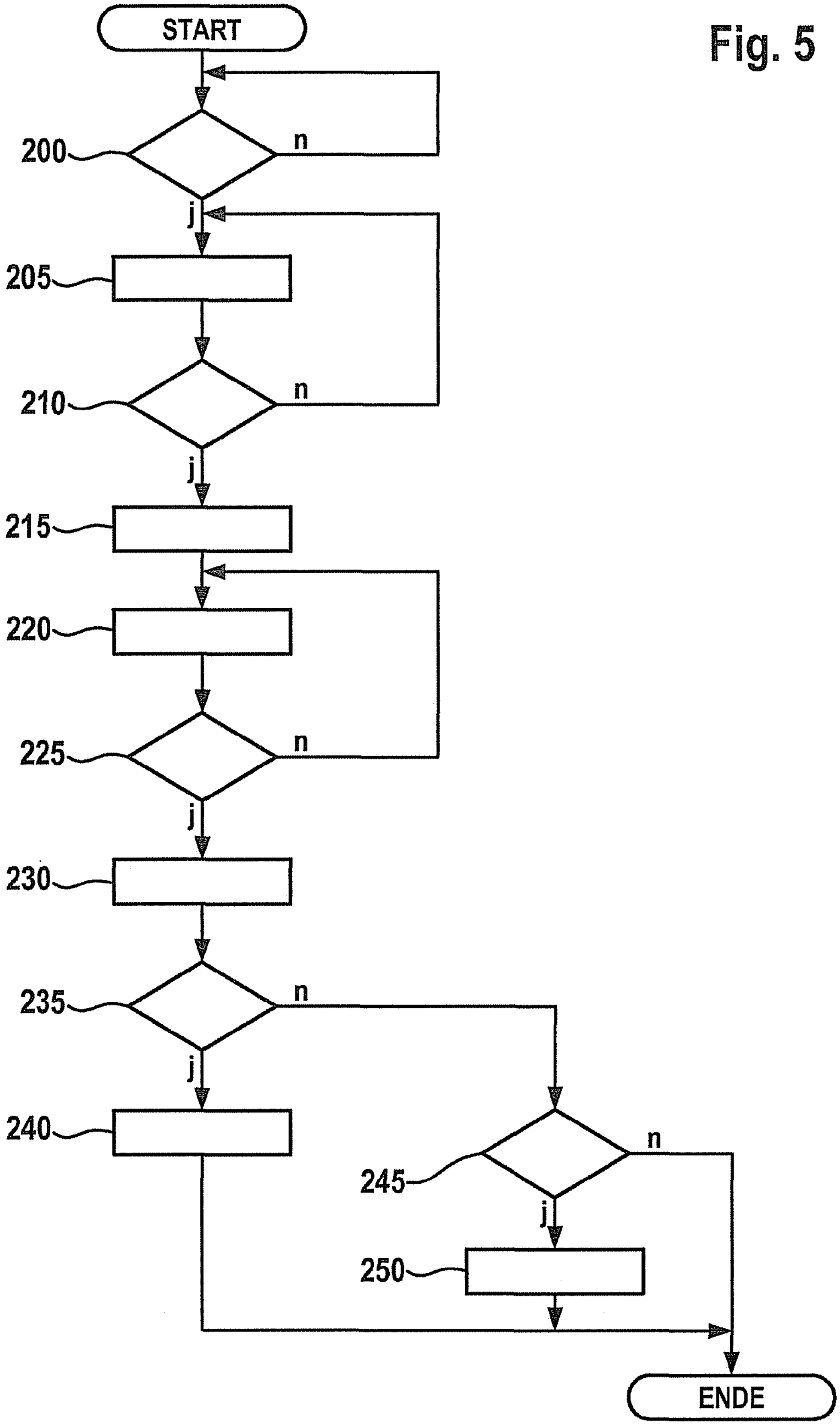
FIG. 5 shows a flow chart of an exemplary functional sequence of the method according to an example embodiment of the present invention.

FIG. 5 shows a flow chart of an exemplary functional sequence of the method according to an example embodiment of the present invention.

Following a program start, for example, when the internal combustion engine is switched on, diagnostic unit 130 checks at a program point 200 on the basis of received enable signal F whether the diagnosis was enabled, i.e., whether enable signal F was set. If this is the case, the program branches to a program point 205; otherwise, the program branches to program point 200.

At program point 205, diagnostic unit 130 prompts adjusting unit 45 to bring throttle valves 5, 10 to their fully closed position. The program subsequently branches to a program point 210.

At program point 210, diagnostic unit 130 checks whether it is receiving a setting signal from first comparison unit 105, thus, whether the fully closed position of throttle valves 5, 10 was reached. If this is the case, the program branches to a program point 215; otherwise, the program branches to program point 205.

At program point 215, determination unit 50 stores the currently determined position of common drive shaft 35 in first memory location 90 of memory unit 85. The program subsequently branches to a program point 220.

At program point 220, diagnostic unit 130 prompts adjusting unit 45 to bring throttle valves 5, 10 to their fully open position. The program subsequently branches to a program point 225.

At program point 225, diagnostic unit 130 checks whether it is again receiving a setting signal from comparison unit 105 since controlling of throttle valves 5, 10 to reach the fully open position thereof, and thus that the fully open position was reached. If this is the case, the program branches back to a program point 230; otherwise, the program branches to program point 220.

At program point 230, diagnostic unit 130 prompts the storing of the position of common drive shaft currently determined by determination unit 50 in second memory location 95 of memory unit 85. At program point 230, the difference between the first position and the second position is then computed, and the absolute value of this difference is subsequently generated in absolute-value generator 115. The program subsequently branches to a program point 235.

At program point 235, first comparison unit 60 checks whether the absolute value of the difference is less than the first predefined threshold value of second threshold value memory 120. If this is the case, the program branches to a program point 240, otherwise the program branches to a program point 245.

At program point 240, second comparison unit 60 transmits a setting signal to first error detection unit 70 which then, in response to the receipt of the setting signal, transmits a set first error signal F1 to diagnostic unit 130. The program is subsequently exited.

At program point 245, third comparison unit 65 checks whether the absolute value of the difference is less than the second predefined threshold value of third threshold value memory 125. If this is the case, the program branches to a program point 250, otherwise the program is exited.

At program point 250, third comparison unit 65, at the output thereof, transmits a setting signal to second error detection unit 75 which then, in response to the receipt of the setting signal of diagnostic unit 130, transmits a set, second error signal F2 to diagnostic unit 130. The program is subsequently exited.

In the case of the no-branching from program point 245, both first error signal F1, as well as second error signal F2 are reset. The program may be executed repeatedly.

The method according to example embodiments of the present invention and the device according to example embodiments of the present invention were described for the case of two mass flow channels 15, 20, each having one throttle valve 5, 10, but may be realized in the same manner for any given number of mass flow channels, each having one throttle valve.

In the case of a set first error signal F1 and/or of a set second error signal F2, a component exchange may be initiated in the workshop, in the case of which the entire component, together with mass flow channels 15, 20, common drive shaft 35, and throttle valves 5, 10, is exchanged. It is thus possible to avoid an imprecise airflow control having negative influences, for example, on the exhaust gas.

If the absolute value of the difference falls below the first predefined threshold value of second threshold value memory 120, then, under the condition of a correctly adjusted second mechanical limit stop 30, the synchronism of the two throttle valves 5, 10 in mass flow channels 15, 20 is no longer ensured, whether it be due to manufacturing tolerances, faulty assembly or wear during operation.

What is claimed is:

1. A method for checking an adjustment of a plurality of actuators driven by a common drive in different mass flow channels, comprising:

adjusting the actuators between a first limit stop and a second limit stop in the particular mass flow channel;

bringing the actuators by the common drive to the first limit stop;

ascertaining a first value of a variable that is characteristic of a position of the common drive of the actuators when the first limit stop is reached;

bringing the actuators by the common drive to the second limit stop;

ascertaining a second value of the variable that is characteristic of the position of the common drive of the actuators when the second limit stop is reached;

determining a difference between the first value and the second value;

comparing the difference in terms of absolute value to at least one predefined threshold value; and recognizing an error in the adjustment of the actuators in the mass flow channels when the absolute value of the difference deviates unacceptably from at least one predefined threshold value.

2. The method according to claim 1, wherein the first limit stop is at least one of (a) configured at a wall of the mass flow channel and (b) formed by the wall of the mass flow channel, and the actuators are in their fully closed position upon reaching the first limit stop.

3. The method according to claim 1, wherein the second limit stop is configured as a limit stop for the common drive, and the actuators are in their fully open position upon reaching the second limit stop.

4. The method according to claim 1, wherein the actuators reaching one of the limit stops is recognized on the basis of exceedance in terms of absolute value of a predefined threshold value by a drive current of the actuators.

5. The method according to claim 1, wherein, for the case when the first limit stop is contacted by one of the actuators when the actuators are brought to the first limit stop and when the second limit stop is contacted by the common drive when the actuators are brought to the second limit stop, at least one of (a) a faulty adjustment is recognized between the actuators configured on a common drive shaft and (b) a faulty adjustment of the second limit stop when, in terms of absolute value, the difference is less than a first predefined threshold value.

6. The method according to claim 5, wherein, for the case when the first limit stop is contacted by one of the actuators when the actuators are brought to the first limit stop and when the second limit stop is contacted by the common drive when the actuators are brought to the second limit stop, a faulty adjustment of the second limit stop is recognized when, in terms of absolute value, the difference exceeds a second predefined threshold value.

7. The method according to claim 6, wherein the second predefined threshold value is greater than the first predefined threshold value. value of a predefined threshold value by a drive current of the actuators.

8. A device for checking an adjustment of a plurality of actuators driven by a common drive in different mass flow channels, comprising:

an adjustment device adapted to adjust the actuators between a first limit stop and a second limit stop in the particular mass flow channel, the adjustment device adapted to bring the actuators via the common drive to the first limit stop, and to bring the actuators via the common drive to the second limit stop;

a determination means device adapted to determine a first value of a variable that is characteristic of a position of the common drive of the actuators when the first limit stop is reached, and to determine a second value of the variable that is characteristic of the position of the common drive of the actuators upon reaching the second limit stop;

a subtraction device adapted to generate a difference between the first value and the second value;

a comparison device adapted to compare the difference in terms of absolute value to at least one predefined threshold value; and an error detection device adapted to recognize an error in the adjustment of the actuators in the various mass flow channels when the absolute value of the difference deviates unacceptably from at least one predefined threshold value.

9. The device according to claim 8, wherein the device is configured to perform a method for checking an adjustment of a plurality of actuators driven by a common drive in different mass flow channels, comprising:

adjusting the actuators between a first limit stop and a second limit stop in the particular mass flow channel;

bringing the actuators by the common drive to the first limit stop;

ascertaining a first value of a variable that is characteristic of a position of the common drive of the actuators when the first limit stop is reached;

bringing the actuators by the common drive to the second limit stop;

ascertaining a second value of the variable that is characteristic of the position of the common drive of the actuators when the second limit stop is reached;

determining a difference between the first value and the second value;

comparing the difference in terms of absolute value to at least one predefined threshold value; and recognizing an error in the adjustment of the actuators in the mass flow channels when the absolute value of the difference deviates unacceptably from at least one predefined threshold value.

10. The method according to claim 1, wherein the method is performed by a device for checking an adjustment of a plurality of actuators driven by a common drive in different mass flow channels, comprising:

an adjustment device adapted to adjust the actuators between a first limit stop and a second limit stop in the particular mass flow channel, the adjustment device adapted to bring the actuators via the common drive to the first limit stop, and to bring the actuators via the common drive to the second limit stop;

a determination means device adapted to determine a first value of a variable that is characteristic of a position of the common drive of the actuators when the first limit stop is reached, and to determine a second value of the variable that is characteristic of the position of the common drive of the actuators upon reaching the second limit stop;

a subtraction device adapted to generate a difference between the first value and the second value;

a comparison device adapted to compare the difference in terms of absolute value to at least one predefined threshold value; and an error detection device adapted to recognize an error in the adjustment of the actuators in the various mass flow channels when the absolute value of the difference deviates unacceptably from at least one predefined threshold value.

* * * * *

UNITED STATES PATENT AND TRADEMARK OFFICE

CERTIFICATE OF CORRECTION

PATENT NO. : 8,522,607 B2
APPLICATION NO. : 13/121624
DATED : September 3, 2013
INVENTOR(S) : Grossmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
Fifteenth Day of September, 2015

Michelle K. Lee

Michelle K. Lee
*Director of the United States Patent and Trademark Office*